United States Patent [19]

Heilman et al.

[11] 3,924,409
[45] Dec. 9, 1975

[54] ENGINE SECONDARY AIR FLOW CONTROL VALVE

[75] Inventors: Gerald D. Heilman; Gordon R. Paddock, both of Rochester, N.Y.; Ernst L. Ranft, Rochester, Mich.

[73] Assignee: General Motors Corporation, Detroit, Mich.

[22] Filed: Nov. 22, 1974

[21] Appl. No.: 526,380

[52] U.S. Cl. .................................... 60/290; 60/306
[51] Int. Cl.² ........................................ F02B 75/10
[58] Field of Search ............................. 60/290, 306

[56] References Cited
UNITED STATES PATENTS

| | | | |
|---|---|---|---|
| 3,805,522 | 4/1974 | Sheppard | 60/290 |
| 3,826,089 | 7/1974 | Nakajima | 60/290 |
| 3,849,984 | 11/1974 | Toda | 60/290 |

*Primary Examiner*—Douglas Hart
*Attorney, Agent, or Firm*—Robert M. Sigler

[57] ABSTRACT

An air flow control valve for use with an internal combustion engine has a valve chamber with an inlet from an air pump, a first outlet connected to the engine exhaust system upstream and remote from a catalytic converter, a second outlet connected to the catalytic converter and a third outlet openable to the atmosphere through a pressure relief valve. An expansible chamber motor comprises a movable wall defining two motor chambers and a stem attached to the movable wall projecting through the valve chamber. A pair of valve members slidably disposed on the stem normally closes the first and second outlets; but a first stop on the stem engages one to open the first outlet upon wall movement in one direction from a central position, and a second stop on the stem engages the other to open the second outlet upon wall movement in the other direction from the central position. The first chamber is connected by a restrictive flow orifice to the atmosphere and a valved conduit to the valve chamber; the second chamber is connected by a conduit through the stem to the valve chamber and a valved opening to the atmosphere. A first actuator responsive to engine induction vacuum or converter temperature closes the valved conduit in response to a first signal and opens the valved conduit in response to a second signal; while a second actuator responsive to engine induction vacuum opens the valved opening below a high vacuum level and closes the valved opening above that level.

3 Claims, 3 Drawing Figures

ENGINE SECONDARY AIR FLOW CONTROL VALVE

SUMMARY OF THE INVENTION

This invention is an air flow control valve for use in an emission control system for an internal combustion engine, and particularly for use in such an emission control system using both air injection into the exhaust manifold and a catalytic oxidizing converter.

It has been found, when using both an air injected exhaust manifold and a catalytic converter with the same engine, that efficient and trouble-free operation requires the supply of air to one or both of these devices to be cut off under certain engine operating conditions. For instance, injection of air into the exhaust manifold during engine deceleration or coasting can cause backfiring; while injection of air into either the exhaust manifold or catalytic converter during acceleration might lead to overheating in the catalytic converter. This invention is a valve which controls the flow of air from an air pump to the exhaust manifold and catalytic converter to prevent any such backfiring or overheating. Further details and advantages of this invention will be apparent in the accompanying figures and following description of a preferred embodiment.

DESCRIPTION OF THE PREFERRED EMBODIMENT

Figure 1:
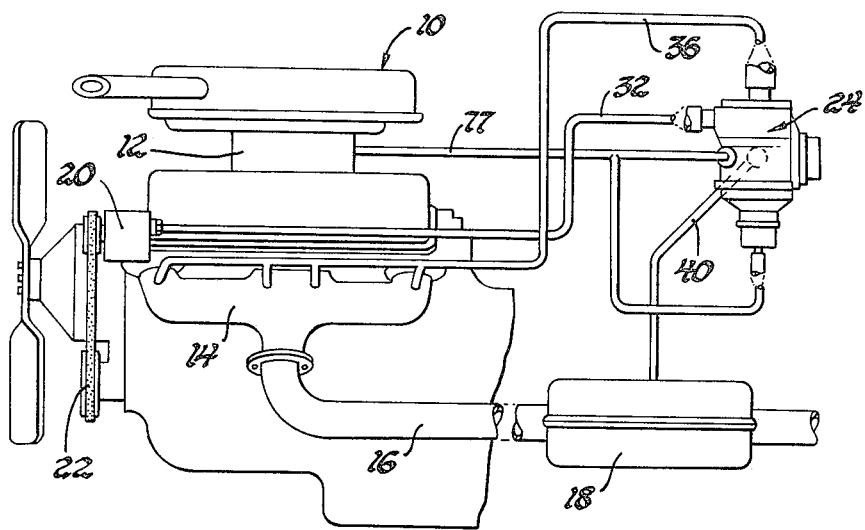
FIG. 1 shows a valve of this invention in its environment.

Referring to FIG. 1, an internal combustion engine 10 has an air induction system 12 and an exhaust system including an exhaust manifold 14, an exhaust pipe 16 and a catalytic oxidizing converter 18. Engine 10 drives an air pump 20 by means of drive belt 22.

Figure 2:
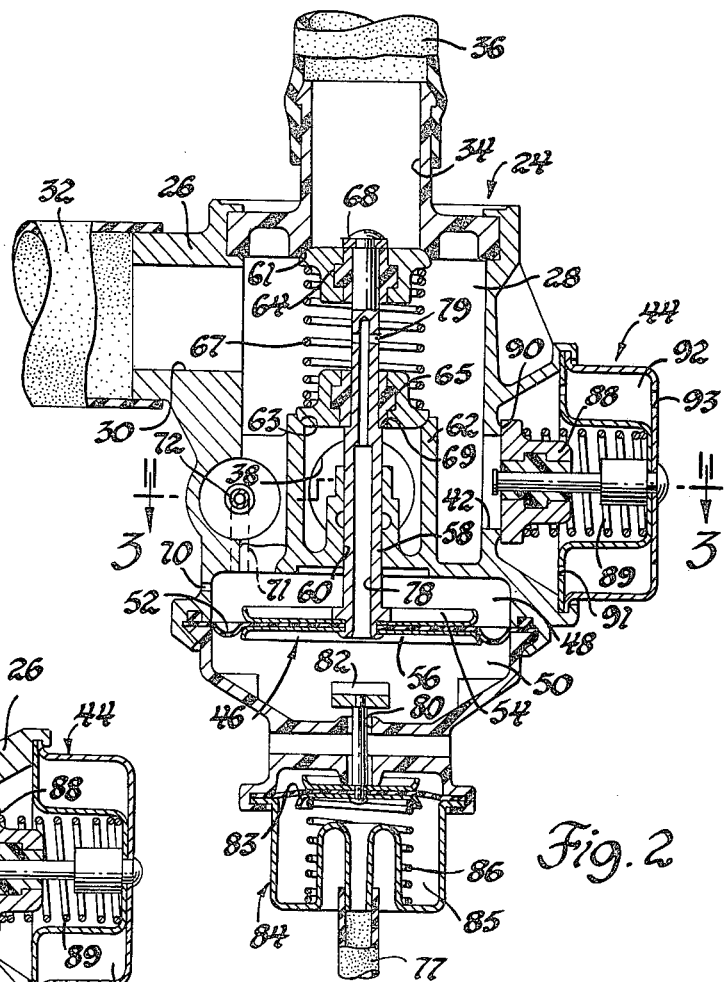
FIG. 2 is a side cutaway view of a preferred embodiment of the valve of this invention.
Figure 3:
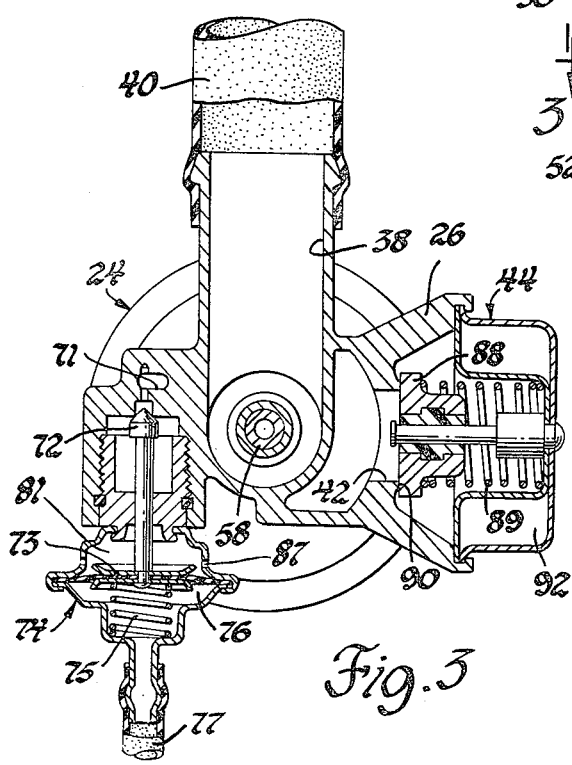
FIG. 3 is a cutaway view along line 3—3 in FIG. 2.

Referring to FIG. 2, air control valve 24 comprises a valve body 26 defining a valve chamber 28. Valve body 26 further defines, in connection with valve chamber 28, an inlet 30 connected, as shown in FIG. 1, by conduit 32 to the outlet of air pump 20, a first outlet 34 connected by a conduit 36 to exhaust manifold 14 at points near the outlet ports of engine 10, a second outlet 38 connected by a conduit 40, as shown in FIGS. 1 and 3, to catalytic converter 18 and a third outlet 42 opening to the atmosphere through a pressure relief valve 44.

Valve body 26 also defines a cavity divided by a movable wall 46 into a first chamber 48 and a second chamber 50 to form an expansible chamber motor. In this embodiment movable wall 46 comprises a flexible diaphragm 52 sandwiched between a pair of rigid disks 54 and 56. Diaphragm 52 is peripherally sealed and fastened to valve body 26; however, disks 54 and 56 are not fastened to valve body 26 but serve as a rigid platform movable by flexible diaphragm 52, to which platform is attached a stem 58. Stem 58 extends perpendicularly from disks 54 and 56 through chamber 48 and an opening 60 in valve body 26 into valve chamber 28, stem 58 fitting snugly in opening 60 to be slidable therein but prevent any substantial leakage of air therethrough.

Within valve chamber 28, valve body 26 forms a first valve seat 61 surrounding first outlet 34 and coaxial with stem 58. In addition, a tube 62 extends from valve body 26 into valve chamber 28 coaxial with and surrounding stem 58 and open to second outlet 38. On the free end of tube 62 a second valve seat 63 is formed. A first valve member 64 and second valve member 65 are slidably received on stem 58 and biased apart by a spring 67 so that first valve member 64 normally closes first outlet 61 and second valve member 65 normally closes second outlet 63.

The position of movable wall 46 and stem 58 depends on the pressure difference across movable wall 46. Movable wall 46 assumes a central position when the air pressures in chambers 48 and 50 are equal. Stem 58 has formed thereon a first stop 68 beyond valve member 64 within first outlet 34 and a second stop 69 adjacent valve member 65 within tube 62. When movable wall 46 assumes its central position, both first outlet 34 and second outlet 38 are closed. However, as air pressure in chamber 48 exceeds that in chamber 50 and movable wall 46 moves downward in FIG. 2, first stop 68 engages first valve member 64 and pulls it against the bias of spring 67 away from first valve seat 61 to open first outlet 34. Likewise, when movable wall 46 and stem 58 move upward from the central position due to an excess of air pressure in chamber 50 over that in chamber 48, stop 69 engages valve member 65 and pushes it away from second valve seat 63 against the bias of spring 67 to open second outlet 38.

Valve body 26 includes a restricted orifice 70 which allows air flow at a restricted rate between chamber 48 and the atmosphere and a valved conduit 71 connecting chamber 48 to valve chamber 28. As seen in FIG. 3, valved conduit 71 can be opened or closed by a valve member 72 which, in this embodiment, is attached to the diaphragm assembly 73 of an expansible chamber motor 74 containing a spring 75 to normally bias valve member 72 to the closed position. Diaphragm assembly 73 divides expansible chamber motor 74 into a chamber 76 connected through a conduit 77 to the air induction system 12 of engine 10, through which conduit 77 the air induction system 12 supplies an engine induction manifold vacuum signal, and a chamber 81 open to atmosphere through one or more openings 87.

A central conduit 78 and transverse opening 79 in stem 58 allow air flow between chamber 50 and valve chamber 28. A valved opening 80 in valve body 26 is sized in relation to conduit 78 to adequately vent chamber 50 to the atmosphere. As shown in FIG. 2, a valve member 82 for closing valved opening 80 is attached for co-movement to a diaphragm assembly 83 of an expansible chamber motor 84. Motor 84 includes a chamber 85 open to induction system 12 through conduit 77 and a spring 86 acting on diaphragm assembly 83 to normally bias valve member 82 into the open position.

Pressure relief valve 44 comprises a valve member 88 normally biased by a spring 89 against a valve seat 90 surrounding third outlet 42. Air pressure in excess of a preset relief pressure within valve chamber 28 pushes valve member 88 against the bias of spring 89 to open third outlet 42, whereupon valve chamber 28 opens to the atmosphere through openings 91, chamber 92 and openings 93. Chamber 92 may be provided with baffles or a sound deadening material to reduce the amount of noise from pump 20 allowed to escape to the atmosphere.

The valve of this invention has three modes of operation, which are controlled by an engine induction manifold vacuum signal. The first or power mode is that shown in the Figures, which is assumed when engine manifold vacuum is less than a fixed low level: in this embodiment, 6 inches of mercury. With valved conduit 71 closed, chamber 48 is maintained at atmospheric pressure through restricted orifice 70; and with valved opening 80 open, chamber 50 is also maintained at atmospheric pressure. With atmospheric pressure in both chambers 48 and 50, movable wall 46 assumes its central position and thus allows both the first and second outlets to remain closed. When air pressure in valve chamber 28 builds up to the relief pressure, pressure relief valve 44 opens to prevent further pressure increase. The supply of air from pump 20 is cut off from both exhaust manifold 14 and catalytic converter 18 to prevent overheating and is all dumped to the atmosphere through pressure relief valve 44.

The normal mode of operation is entered when manifold vacuum exceeds the low level of 6 inches of mercury. Spring 75 of expansible chamber motor 74 is selected so that manifold vacuum greater than 6 inches of mercury applied to chamber 76 opens valved conduit 71 to allow pressurized air from valve chamber 28 to enter chamber 48. Since orifice 70 restricts the air flow therethrough from chamber 48 to the atmosphere, the restriction will cause air pressure to build up in chamber 48 and force movable wall 46 downward to move first valve member 64 away from first valve seat 61 and open first outlet 34, thus allowing air flow from pump 20 to exhaust manifold 14.

When engine manifold vacuum exceeds a high level, such as 18 inches of mercury, the force of the spring 86 in expansible chamber motor 84 is overcome and valved opening 80 is closed, thus placing valve 24 in its deceleration mode. In this mode, air from chamber 28 entering chamber 50 through openings 78 and 79 in stem 58 is no longer allowed to escape to the atmosphere through valved opening 80; and the pressure within chamber 50 therefore builds up to equal the pressure within valve chamber 28. Since valved conduit 71 remains open and restricted orifice 70 allows restricted air flow from chamber 48 to the atmosphere, the pressure in chamber 48 will be at an intermediate level between the pressure of valve chamber 28 and atmosphere. Therefore, movable wall 46 and stem 58 will move upward, allowing valve member 64 to return to its closed position against valve seat 61 and pushing valve member 65 away from valve seat 63 against spring 67 to open second outlet 38 and direct air flow from pump 20 to the converter 18. The cutoff of air to the exhaust manifold 14 prevents backfiring; and the supply of air to the catalytic converter 18 has been found to assist in cooling. Of course, even while in the normal mode or deceleration mode, the valve assembly will vent air at excess pressure to the atmosphere through pressure relief valve 44.

In an alternative embodiment, expansible chamber motor 74 could be replaced by an electrical solenoid motor energized from a source of electric power such as a vehicle battery or alternator through a temperature sensitive switch responsive to the temperature of catalytic converter 18. The switch and solenoid would be chosen and connected so that, under normal converter temperatures, that is, temperatures below a preselected switch temperature, the solenoid would be energized to actuate valve member 72 and open valved conduit 71. This condition along with engine induction vacuum below the high vacuum level, corresponds to the second mode of the first embodiment.

Under converter temperatures above the switch temperature, the switch would de-energize the solenoid, which would be provided with bias means to move valve member 72 and close valved conduit 71 when not energized. This condition of the solenoid, along with engine induction vacuum below the high level, corresponds to the first mode of the first embodiment.

Engine induction vacuum above the high level, as in the first embodiment, would put the valve in its third mode of operation, regardless of converter temperature.

These embodiments of our invention are preferred embodiments, but not the only operable embodiments. Since equivalents will occur to those skilled in the art, the scope of our invention should be limited only by the claims which follow.

The embodiments of the invention in which an exclusive property or privilege is claimed are defined as follows:

.1. An air control valve for use with an internal combustion engine having an air induction system for supplying air to the engine and generating an engine induction vacuum signal, an exhaust system for exhaust gas flow from the engine, a catalytic converter in the exhaust system for promoting oxidation of exhaust gas constituents and an air supply system including an air pump and having a first branch for delivering air to the exhaust system at a point upstream and remote from the catalytic converter and a second branch for delivering air to the catalytic converter, the air control valve comprising, in combination:

a valve body defining a valve chamber having an inlet connected to the air pump, a first outlet connected to the first branch, a second outlet connected to the second branch and a third outlet openable to the atmosphere by a pressure relief valve, the valve body further including a pair of axially opposed valve seats in the valve chamber surrounding the first and second outlets; a stem projecting coaxially through the valve seats and valve chamber; first and second valve members slidably disposed on the stem; a spring compressed between the first and second valve members to normally bias the first valve member against the first valve seat to close the first outlet and bias the second valve member against the second valve seat to close the second outlet; an expansible chamber motor comprising a movable wall defining first and second motor chambers in the valve body, the movable wall being responsive to the pressure difference thereacross to assume a central position when the pressure difference is zero and move in one or the other direction from the central position when air pressure in the first motor chamber exceeds that in the second motor chamber or the air pressure in the second motor chamber exceeds that in the first motor chamber, respectively, the movable wall further having the stem attached thereto for co-movement, the stem having a first stop effective to engage the first valve member and open the first outlet with movement of the movable wall in the one direction from its central position and a second stop effective to engage the second valve member and open the second outlet with movement of the movable wall in the other direction from its central position; a restricted flow orifice in the valve body opening the first motor chamber to the atmosphere; a valved conduit in the valve body opening the first motor chamber to the valve chamber; a conduit in the stem opening the second motor chamber to the valve chamber; a valved opening in the valve body opening the second motor chamber to the atmosphere; a first actuator responsive to a first signal to close the valved conduit and responsive to a second signal to open the valved conduit; and a second actuator responsive to the engine induction vacuum signal to open the valved opening below a high vacuum signal level and close the valved opening above the high level.

2. An air control valve for use with an internal combustion engine having an air induction system effective to generate an engine vacuum signal, an exhaust system for exhaust gas flow from the engine, a catalytic converter in the exhaust system for promoting oxidation of exhaust gas constituents and an air supply system including an air pump and having a first branch for delivering air to the exhaust system at a location upstream and remote from the catalytic converter and a second branch for delivering air to the catalytic converter, the air control valve comprising, in combination:

a valve body defining a valve chamber having an inlet connected to the air pump, a first outlet connected to the first branch, a second outlet connected to the second branch, a third outlet to the atmosphere, a first normally closed valve in the first outlet, a second normally closed valve in the second outlet and a pressure relief valve in the third outlet; an expansible chamber motor defining a first motor chamber with a restricted orifice to the atmosphere and a second motor chamber with a valved opening to the atmosphere and including a wall separating the first and second motor chambers, the wall being movable by pressure differences thereacross and including means engageable with the first and second outlet valves to open the first outlet valve when air pressure in the first chamber exceeds that in the second and to open the second outlet valve when air pressure in the second chamber exceeds that in the first; a first conduit connecting the first motor chamber with the valve chamber and including a conduit valve; a second conduit connecting the second motor chamber and the valve chamber; a first actuator responsive to the engine vacuum signal to close the conduit valve below a low vacuum signal level and open the conduit valve above the low level; and a second actuator responsive to engine vacuum to open the second chamber opening valve below a high vacuum signal level and close the second chamber opening valve above the high level.

3. An air control valve for use with an internal combustion engine having an air induction system for supplying air to the engine and generating an engine induction vacuum signal, an exhaust system for exhaust gas flow from the engine, a catalytic converter in the exhaust system for promoting oxidation of exhaust gas constituents and an air supply system including an air pump and having a first branch for delivering air to the exhaust system at a point upstream and remote from the catalytic converter and a second branch for delivering air to the catalytic converter, the air control valve comprising, in combination:

a valve body defining a valve chamber having an inlet connected to the air pump, a first outlet connected to the first branch, a second outlet connected to the second branch and a third outlet openable to the atmosphere by a pressure relief valve, the valve body further including a pair of axially opposed valve seats in the valve chamber surrounding the first and second outlets; a stem projecting coaxially through the valve seats and valve chamber; first and second valve members slidably disposed on the stem; a spring compressed between the first and second valve members to normally bias the first valve member against the first valve seat to close the first outlet and bias the second valve member against the second valve seat to close the second outlet; an expansible chamber motor comprising a movable wall defining first and second motor chambers in the valve body, the movable wall being responsive to the pressure difference thereacross to assume a central position when the pressure difference is zero and move in one or the other direction from the central position when air pressure in the first motor chamber exceeds that in the second motor chamber or the air pressure in the second motor chamber exceeds that in the first motor chamber, respectively, the movable wall further having the stem attached thereto for co-movement, the stem having a first stop effective to engage the first valve member and open the first outlet with movement of the movable wall in the one direction from its central position and a second stop effective to engage the second valve member and open the second outlet with movement of the movable wall in the other direction from its central position; a restricted flow orifice in the valve body opening the first motor chamber to the atmosphere; a valved conduit in the valve body opening the first motor chamber to the valve chamber; a conduit in the stem opening the second motor chamber to the valve chamber; a valved opening in the valve body opening the second motor chamber to the atmosphere; a first actuator responsive to the engine induction vacuum signal to close the valved conduit below a low vacuum signal level and open the valved conduit above the low level; and a second actuator responsive to the engine induction vacuum signal to open the valved opening below a high vacuum signal level and close the valved opening above the high level.

* * * * *